US008223680B2

(12) United States Patent
Twitchell, Jr.

(10) Patent No.: US 8,223,680 B2
(45) Date of Patent: Jul. 17, 2012

(54) MESH NETWORK CONTROL USING COMMON DESIGNATION WAKE-UP

(75) Inventor: Robert W. Twitchell, Jr., Cumming, GA (US)

(73) Assignee: Google Inc., Mountain View, CA (US)

( * ) Notice: Subject to any disclaimer, the term of this patent is extended or adjusted under 35 U.S.C. 154(b) by 732 days.

(21) Appl. No.: 12/352,992

(22) Filed: Jan. 13, 2009

(65) Prior Publication Data

US 2009/0122737 A1    May 14, 2009

Related U.S. Application Data

(63) Continuation of application No. PCT/US2008/054633, filed on Feb. 21, 2008.

(60) Provisional application No. 60/890,990, filed on Feb. 21, 2007.

(51) Int. Cl.
*G08C 17/00* (2006.01)
*H04B 7/185* (2006.01)
*H04B 1/38* (2006.01)

(52) U.S. Cl. ...... 370/311; 370/318; 455/574; 455/343.2

(58) Field of Classification Search .................. 370/235, 370/254, 310, 310.2, 311, 312, 315, 318, 370/328, 335, 338, 351, 400, 401, 402, 404, 370/405, 408; 455/41.2, 41.3, 88, 343.1, 455/343.2, 343.3, 343.4, 343.5, 402, 422.1, 455/456.1, 500, 515, 517, 522, 574
See application file for complete search history.

(56) References Cited

U.S. PATENT DOCUMENTS

| | | | |
|---|---|---|---|
| 3,805,265 A | 4/1974 | Lester | |
| 4,165,024 A | 8/1979 | Oswalt et al. | |
| 4,613,990 A | 9/1986 | Halpern | |
| 4,680,583 A | 7/1987 | Grover | |
| 4,688,244 A | 8/1987 | Hannon et al. | |

(Continued)

FOREIGN PATENT DOCUMENTS

EP    0467036    1/1992

(Continued)

OTHER PUBLICATIONS

U.S. Appl. No. 60/444,029, of Nageli, filed Jan. 31, 2003.

(Continued)

*Primary Examiner* — Habte Mered
(74) *Attorney, Agent, or Firm* — Tillman Wright, PLLC; Chad D. Tillman; Jeremy C. Doerre

(57) ABSTRACT

Each of a plurality of network nodes in an ad hoc mesh network utilizes a data communication device that includes a two-way communications component, comprising a first receiver and transmitter, and a second receiver. The second receiver activates the communications component from a dormant state when it receives a broadcast including a wake-up identifier of the communication device. A method of activating and deactivating a mesh network includes, first, transmitting a broadcast that includes a wake-up identifier such that each second receiver of each communication device identified by the wake-up identifier, upon receipt, activates the communications component of the communication device, which then engages in mesh networking communications, and, second, transmitting a second broadcast including a second identifier such that the communications component of each communication device identified by the second identifier, upon receipt, will cease its mesh networking communications and will return to the dormant state.

23 Claims, 11 Drawing Sheets

U.S. PATENT DOCUMENTS

| | | | |
|---|---|---|---|
| 4,750,197 A | 6/1988 | Denekamp et al. |
| 4,817,537 A | 4/1989 | Cripe et al. |
| 5,040,238 A | 8/1991 | Comroe et al. |
| 5,054,052 A | 10/1991 | Nonami |
| 5,117,501 A | 5/1992 | Childress et al. |
| 5,129,096 A | 7/1992 | Burns |
| 5,210,540 A | 5/1993 | Masumoto |
| 5,265,025 A | 11/1993 | Hirata |
| 5,295,154 A | 3/1994 | Meier et al. |
| 5,331,637 A | 7/1994 | Francis et al. |
| 5,369,784 A | 11/1994 | Nelson |
| 5,400,254 A | 3/1995 | Fujita |
| 5,425,051 A | 6/1995 | Mahany |
| 5,442,758 A | 8/1995 | Slingwine et al. |
| 5,511,232 A | 4/1996 | O'Dea et al. |
| 5,565,858 A | 10/1996 | Guthrie |
| 5,579,306 A | 11/1996 | Dent |
| 5,590,409 A | 12/1996 | Sawahashi et al. |
| 5,596,652 A | 1/1997 | Piatek et al. |
| 5,604,892 A | 2/1997 | Nuttall et al. |
| 5,606,313 A | 2/1997 | Allen et al. |
| 5,640,151 A | 6/1997 | Reis et al. |
| 5,652,751 A | 7/1997 | Sharony |
| 5,682,379 A | 10/1997 | Mahany et al. |
| 5,686,902 A | 11/1997 | Reis et al. |
| 5,732,007 A | 3/1998 | Grushin et al. |
| 5,761,195 A | 6/1998 | Lu et al. |
| 5,790,946 A | 8/1998 | Rotzoll |
| 5,793,882 A | 8/1998 | Piatek et al. |
| 5,833,910 A | 11/1998 | Teixido |
| 5,862,803 A | 1/1999 | Besson |
| 5,890,054 A | 3/1999 | Logsdon et al. |
| 5,892,441 A | 4/1999 | Woolley et al. |
| 5,907,491 A | 5/1999 | Canada et al. |
| 5,917,423 A | 6/1999 | Duvall |
| 5,939,982 A | 8/1999 | Gagnon et al. |
| 5,943,610 A | 8/1999 | Endo |
| 5,950,124 A | 9/1999 | Trompower et al. |
| 5,974,236 A | 10/1999 | Sherman |
| 5,977,913 A | 11/1999 | Christ |
| 6,005,884 A | 12/1999 | Cook et al. |
| 6,006,100 A | 12/1999 | Koenck et al. |
| 6,072,784 A | 6/2000 | Agrawal et al. |
| 6,078,789 A | 6/2000 | Bodenmann et al. |
| 6,091,724 A | 7/2000 | Chandra et al. |
| 6,097,707 A | 8/2000 | Hodzic et al. |
| 6,104,512 A | 8/2000 | Batey, Jr. et al. |
| 6,118,988 A | 9/2000 | Choi |
| 6,125,306 A | 9/2000 | Shimada et al. |
| 6,127,928 A | 10/2000 | Issacman |
| 6,127,976 A | 10/2000 | Boyd et al. |
| 6,134,587 A | 10/2000 | Okanoue |
| 6,192,400 B1 | 2/2001 | Hanson et al. |
| 6,198,913 B1 | 3/2001 | Sung et al. |
| 6,201,974 B1 | 3/2001 | Lietsalmi et al. |
| 6,256,303 B1 | 7/2001 | Drakoulis et al. |
| 6,313,745 B1 | 11/2001 | Suzuki |
| 6,354,493 B1 | 3/2002 | Mon |
| 6,360,169 B1 | 3/2002 | Dudaney |
| 6,381,467 B1 | 4/2002 | Hill et al. |
| 6,404,082 B1 | 6/2002 | Rasinski et al. |
| 6,405,102 B1 | 6/2002 | Swartz et al. |
| 6,409,082 B1 | 6/2002 | Davis et al. |
| 6,418,299 B1 | 7/2002 | Ramanathan |
| 6,424,260 B2 | 7/2002 | Maloney |
| 6,424,264 B1 | 7/2002 | Giraldin et al. |
| 6,427,913 B1 | 8/2002 | Maloney |
| 6,437,692 B1 | 8/2002 | Petite |
| 6,473,607 B1 | 10/2002 | Shohara et al. |
| 6,476,708 B1 | 11/2002 | Johnson |
| 6,512,478 B1 | 1/2003 | Chien |
| 6,529,142 B2 | 3/2003 | Yeh et al. |
| 6,542,114 B1 | 4/2003 | Eagleson et al. |
| 6,547,137 B1 | 4/2003 | Begelfer et al. |
| 6,559,620 B2 | 5/2003 | Zhou et al. |
| 6,587,755 B1 | 7/2003 | Smith et al. |
| 6,600,418 B2 | 7/2003 | Francis et al. |
| 6,611,556 B1 | 8/2003 | Koerner et al. |
| 6,614,349 B1 | 9/2003 | Proctor et al. |
| 6,617,962 B1 | 9/2003 | Horwitz et al. |
| 6,665,585 B2 | 12/2003 | Kawase |
| 6,700,533 B1 | 3/2004 | Werb et al. |
| 6,720,888 B2 | 4/2004 | Eagleson et al. |
| 6,737,974 B2 | 5/2004 | Dickinson |
| 6,747,562 B2 | 6/2004 | Giraldin et al. |
| 6,753,775 B2 | 6/2004 | Auerbach et al. |
| 6,760,578 B2 | 7/2004 | Rotzoll |
| 6,761,312 B2 | 7/2004 | Piatek et al. |
| 6,765,484 B2 | 7/2004 | Eagleson et al. |
| 6,816,063 B2 | 11/2004 | Kubler et al. |
| 6,847,892 B2 | 1/2005 | Zhou et al. |
| 6,919,803 B2 | 7/2005 | Breed |
| 6,927,688 B2 | 8/2005 | Tice |
| 6,940,392 B2 | 9/2005 | Chan et al. |
| 6,975,614 B2 | 12/2005 | Kennedy |
| 7,012,529 B2 | 3/2006 | Sajkowsky |
| 7,027,773 B1 | 4/2006 | McMillin |
| 7,088,229 B2 | 8/2006 | Johnson |
| 7,098,784 B2 | 8/2006 | Easley et al. |
| 7,103,344 B2 | 9/2006 | Menard |
| 7,126,470 B2 | 10/2006 | Clift et al. |
| 7,142,121 B2 | 11/2006 | Chan et al. |
| 7,191,934 B2 | 3/2007 | Miller et al. |
| 7,196,622 B2 | 3/2007 | Lambright et al. |
| 7,209,468 B2 * | 4/2007 | Twitchell, Jr. ............... 370/338 |
| 7,212,122 B2 | 5/2007 | Gloekler et al. |
| 7,221,668 B2 * | 5/2007 | Twitchell, Jr. ............... 370/338 |
| 7,230,933 B2 | 6/2007 | Bahl et al. |
| 7,282,944 B2 | 10/2007 | Gunn et al. |
| 7,348,875 B2 | 3/2008 | Hughes et al. |
| 7,349,803 B2 | 3/2008 | Belenkii et al. |
| 7,349,804 B2 | 3/2008 | Belenkii et al. |
| 7,376,507 B1 | 5/2008 | Daily et al. |
| 7,440,781 B2 | 10/2008 | Beach et al. |
| 7,596,152 B2 * | 9/2009 | Yarvis et al. ............... 370/503 |
| 2001/0000019 A1 | 3/2001 | Bowers et al. |
| 2001/0050550 A1 | 12/2001 | Yoshida et al. |
| 2002/0039896 A1 | 4/2002 | Brown |
| 2002/0050932 A1 | 5/2002 | Rhoades et al. |
| 2002/0089434 A1 | 7/2002 | Ghazarian |
| 2002/0098861 A1 | 7/2002 | Doney et al. |
| 2002/0146985 A1 | 10/2002 | Naden |
| 2003/0008692 A1 | 1/2003 | Phelan |
| 2003/0083064 A1 | 5/2003 | Cooper |
| 2003/0141973 A1 | 7/2003 | Yeh et al. |
| 2003/0144020 A1 | 7/2003 | Challa et al. |
| 2003/0179073 A1 | 9/2003 | Ghazarian |
| 2003/0182077 A1 | 9/2003 | Emord |
| 2003/0209601 A1 | 11/2003 | Chung |
| 2003/0236077 A1 | 12/2003 | Sivard |
| 2004/0021572 A1 | 2/2004 | Schoen et al. |
| 2004/0041731 A1 | 3/2004 | Hisano |
| 2004/0100394 A1 | 5/2004 | Hitt |
| 2004/0100415 A1 | 5/2004 | Veitch et al. |
| 2004/0119588 A1 | 6/2004 | Marks |
| 2004/0121793 A1 | 6/2004 | Weigele et al. |
| 2004/0135691 A1 | 7/2004 | Duron et al. |
| 2004/0183673 A1 | 9/2004 | Nageli |
| 2004/0232924 A1 | 11/2004 | Hilleary et al. |
| 2004/0233041 A1 | 11/2004 | Bohman et al. |
| 2004/0233054 A1 | 11/2004 | Neff et al. |
| 2004/0246463 A1 | 12/2004 | Milinusic |
| 2005/0043068 A1 | 2/2005 | Shohara et al. |
| 2005/0073406 A1 | 4/2005 | Easley et al. |
| 2005/0087235 A1 | 4/2005 | Skorpik |
| 2005/0088299 A1 | 4/2005 | Bandy et al. |
| 2005/0090211 A1 | 4/2005 | Lilja et al. |
| 2005/0128080 A1 | 6/2005 | Hall et al. |
| 2005/0145018 A1 | 7/2005 | Sabata et al. |
| 2005/0146445 A1 | 7/2005 | Sleboda et al. |
| 2005/0190759 A1 | 9/2005 | Lee |
| 2005/0199716 A1 | 9/2005 | Shafer et al. |
| 2005/0226201 A1 | 10/2005 | McMillin |
| 2005/0261037 A1 | 11/2005 | Raghunath et al. |
| 2005/0270160 A1 | 12/2005 | Chan et al. |
| 2006/0023678 A1 * | 2/2006 | Twitchell ............... 370/338 |
| 2006/0109106 A1 | 5/2006 | Braun |

| | | | |
|---|---|---|---|
| 2006/0114102 | A1 | 6/2006 | Chang et al. |
| 2006/0135145 | A1 | 6/2006 | Redi |
| 2006/0163422 | A1 | 7/2006 | Krikorian et al. |
| 2006/0164232 | A1 | 7/2006 | Waterhouse et al. |
| 2006/0164239 | A1 | 7/2006 | Loda |
| 2006/0270382 | A1 | 11/2006 | Lappetelainen et al. |
| 2007/0008408 | A1 | 1/2007 | Zehavi |
| 2007/0032951 | A1 | 2/2007 | Tanenhaus et al. |
| 2007/0135179 | A1 | 6/2007 | Hardman et al. |
| 2009/0116457 | A1* | 5/2009 | Haartsen ............ 370/335 |

FOREIGN PATENT DOCUMENTS

| | | |
|---|---|---|
| EP | 0748083 | 12/1996 |
| EP | 0748085 | 12/1996 |
| EP | 0829995 | 3/1998 |
| EP | 0944014 | 9/1999 |
| EP | 1317733 | 6/2003 |
| EP | 1692599 | 8/2006 |
| EP | 1692668 | 8/2006 |
| GB | 2308947 | 7/1997 |
| KR | 2005-0102419 | 10/2005 |
| KR | 2007-0005515 A | 1/2007 |
| WO | 0068907 | 11/2000 |
| WO | 0069186 | 11/2000 |
| WO | 03098175 | 11/2003 |

OTHER PUBLICATIONS

U.S. Appl. No. 60/499,338, of Easley et al., filed Sep. 3, 2003.

Charles E. Perkins, AD HOC Networks, Jan. 2001, Table of Contents, Chapters 1,4, and 11.

Daniel Lihui Gu et al., C-ICAMA, A Centralized Intelligent Channel Assigned Multiple Access for Multi-Layer Ad-Hoc Wireless Networks with UAVs, 2000, 6 pages.

"Cluster Based Routing Protocol", Internet-Draft, Mingliang, Jiang et al., National University of Singapore, Jul. 1999.

Stojmenovic et al., Design Guidelines for Routing Protocols in Ad Hoc and Sensor Networks with a Realistic Physical Layer, Communications Magazine, IEEE, vol. 43, Issue 3, Mar. 2005, pp. 101-106.

Keshavarzian et al., Energy-Efficient Link Assessment in Wireless Sensor Networks, INFOCOM 2004. 23rd Annual Joint Conference of the IEEE Computer and Communications Societies, vol. 3, 2004, pp. 1751-1761.

Jaap Haartsen, Bluetooth—The Universal Radio Interface for Ad Hoc, Wireless Connectivity, Ericsson Review No. 3, pp. 110-117, 1998.

Guangyu Pei et al., A Wireless Hierarchical Routing Protocol with Group Mobility, 1998 IEEE, 5 pages.

Daniel Lihui Gu et al., Hierarchical Routing for Multi-Layer Ad-Hoc Wireless Networks with UAVs, 2000, 5 pages.

Gary Morgan, Miniature Tags Provide Visibility & Cohesion for an LIA Battalion Level 'Proof of Principle', Pacific NW National Laboratory, Apr. 2001, Gary.morgan@pnl.gov.

http://www/iprg/nokia.com/charliep/txt/manet/term.txt, Mobile Ad Hoc Networking Terminology, C. Perkins, Nov. 17, 1998, visited Nov. 13, 2000.

Jaap Haartsen et al., Bluetooth: Vision, Goals, and Architecture, Mobile Computing & Communications Review, vol. 1, No. 2, 1998, 8 pages.

Guangyu Pei et al., Mobility Management in Hierarchical Multi-hop Mobile Wireless Networks, 1999, 6 pages.

Ram Ramanathan et al., Hierarchically-Organized, Multihop Mobile Wireless Networks for Quality-of-Service Support, 1998, pp. 1-35.

http://www.cs.ucla.edu/NRL/wireless/PAPER/draft-ietf-manet-admrp-02.txt, Sung-Ju Lee et al., On-Demand Multicast Routing Protocol (ODMRP) for Ad Hoc Networks, Jan. 2000, visited Nov. 13, 2000.

Melodia et al., On the Interdependence of Distributed Topology Control and Geographical Routing in Ad Hoc and Networks, Selected Areas in Communications, IEEE Journal, vol. 23, Issue 3, Mar. 2005, pp. 101-106.

Atsushi Iwata et al., Scalable Routing Strategies foe Ad Hoc Wireless Networks, IEEE Journal on Selected Areas in Communications, vol. 17, No. 8, Aug. 1999, pp. 1369-1379.

J.J. Garcia-Luna-Aceves et al., Source-Tree Routing in Wireless Networks, 1999, 10 pages.

Kevin Sharp, Physical Reality: A Second Look, Supply Chain Systems, http://www.idsystems.com/reader/1999_03/phys0399_pt2/index.htm, Helmers Publishing, Inc., Mar. 1999.

Jean-Pierre Hubaux et al., Toward Self-Organized Mobile Ad Hoc Networks: The Teminodes Project, IEEE Communications Magazine, Jan. 2001, pp. 118-124.

"Written Opinion of the International Search Authority" in TERAHOP Networks, Inc. et al. International Patent Application Serial No. PCT/US06/26158, dated Nov. 21, 2006, 7 pages.

"Written Opinion of the International Search Authority" in TERAHOP Networks, Inc. et al. International Patent Application Serial No. PCT/US06/00868, dated Apr. 2, 2007, 3 pages.

* cited by examiner

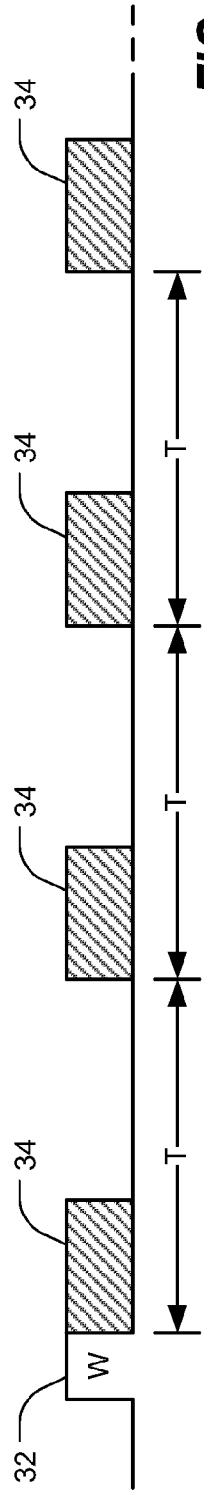
FIG. 2A
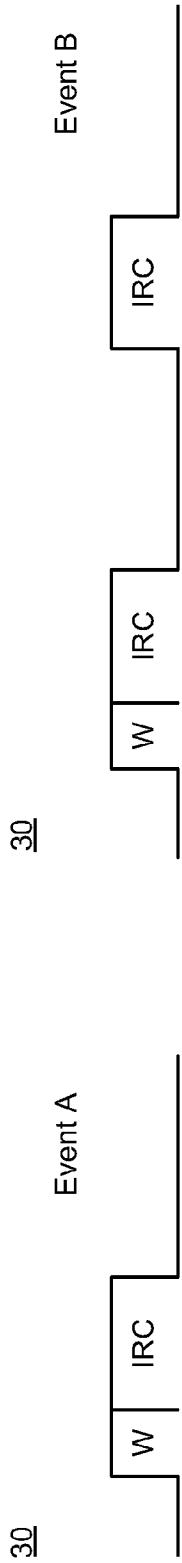
FIG. 2B
FIG. 2C
FIG. 2D
W  common designation wake-up signal
RC  radio communication of the mesh network to complete the event
T  period of the individual mesh node
IRC  individual radio communication of the mesh node W  common designation wake-up signal
RC  radio communication of the mesh network to complete the event
T  period of the individual mesh node
IRC  individual radio communication of the mesh node
E  common designation wake-up signal ending the mesh network event

MESH NETWORK CONTROL USING COMMON DESIGNATION WAKE-UP

CROSS-REFERENCE TO RELATED APPLICATION

The present application is a U.S. continuation patent application of, and claims priority under 35 U.S.C. §120 to, international patent application serial number PCT/US2008/054633 filed on Feb. 21, 2008, and designating the United States, which published as WO2008/103863 on Aug. 28, 2008, and which is a U.S. nonprovisional patent application of, and claims priority under 35 U.S.C. §119(e) to, U.S. provisional patent application Ser. No. 60/890,990, filed Feb. 21, 2007. Each of these patent applications and patent application publication is hereby incorporated herein by reference.

The present application incorporates herein by reference each of: U.S. Pat. Nos. 6,745,027; 6,934,540; 7,209,771; and 7,221,668 as well as U.S. patent application publication nos. 2006/0276161; 2006/0287008; 2007/0002792; and 2007/0155327.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

Mesh networks utilize timers to synchronize the nodes participating in the networks. In particular, each node typically utilizes a crystal oscillator to coordinate its operation with that of other nodes in the network. Unfortunately, the use of such timers by mesh networks to control communications causes throughput, synchronization, power consumption, bit error rate (BER), RF "stealth" and RF noise issues. Mesh networks suffer from a geometric loss of throughput because the state in which the nodes wake up is random. Many schemes are employed to mitigate the issues listed above but at the expense of other parameters.

As previously mentioned, mesh networks synchronize their nodes using timers. Timing issues and crystal oscillator tolerances make time alignment and frequency drift a problem that causes the nodes to wake-up outside their designated time slot. Waking up at the wrong time can lead to the total inability of the nodes to communicate with each other. Other disadvantages include that a large number of nodes can cause interference issues because the nodes are able to receive signals of all of the nodes in range. Further, BER is adversely affected because so many nodes are communicating simultaneously. In addition, RF signatures are readily seen and preclude the use of the networks for surveillance applications.

Based on the foregoing, a need exists for improvement in mesh network control in order to avoid problems presently associated with the use of timers.

SUMMARY OF THE INVENTION

Broadly described, the present invention includes many aspects and features.

The invention relates to ad hoc wireless mesh networking utilizing a data communication device for each of a plurality of nodes thereof, wherein the data communication device includes both a two-way communications component comprising a first receiver and transmitter, and a second receiver, and wherein the second receiver activates the two-way communications component from a dormant state upon receipt by the second receiver of a wake-up broadcast that includes a wake-up identifier of the data communication device.

In accordance with an aspect of the invention, a method of activating and deactivating a mesh network for mesh network communications includes: transmitting a wake-up broadcast that includes a wake-up identifier such that each second receiver of each data communication device identified by the wake-up identifier, upon receiving the wake-up broadcast, activates the two-way communications component of the data communication device, and thereafter the data communication device will engage in mesh networking communications; and transmitting a second broadcast that includes a second identifier such that the two-way communications component of each data communication device identified by the second identifier, upon receiving the second broadcast, will cease its mesh networking communications and will return to the dormant state In features of this aspect, the second broadcast is transmitted by the first transmitter of the two-way communications component of a data communication device; the second receiver of a data communication device is part of a wake-up transceiver of in data communication device, and wherein the second broadcast is transmitted by a second transmitter of the wake-up transceiver; the second broadcast is received by the first receiver of the two-way communications component of a data communication device; the second broadcast is received by the second receiver of a data communication device; the second receiver of a data communication device is part of a wake-up transceiver in the data communication device, and wherein the second broadcast is received by the second receiver of the wake-up transceiver; the two-way communications component of each data communication device is off when in the dormant state; the second receiver of a data communication device draws substantially less current while listening for a wake-up broadcast than the two-way communications component would draw while listening for a wake-up broadcast; the second receiver of a data communication device draws less current while listening for a wake-up broadcast than the two-way communications component would draw while listening for a wake-up broadcast, the difference in current draw being at least an order of magnitude (such as milliamps versus microamps); the second receiver of a data communication device utilizes a stepped wake-up sequence based on at least two criteria, and wherein the last criteria before awakening the two-way communications component comprises identifying a wake-up identifier of the data communication device in the wake-up broadcast; and the second receiver of a data communication device is part of a wake-up transceiver, the wake-up transceiver further comprising a second transmitter of the data communication device that is configured to transmit a wake-up broadcast for receipt by another wake-up receiver of another data communication device In an additional feature, the wake-up identifier represents a node performance characteristic. The performance characteristic may include bit error rate; throughput of the node; strength of the radiofrequency communication link; and range, determined using values such as Received Signal Strength Indication, or "RSSI"

Furthermore, the mesh network that is activated may include only a subset of nodes out of a plurality of nodes that otherwise are available for making a larger mesh network. In this respect, the selection of nodes preferably is determined based on the wake-up identifier included in the wake-up broadcast that is transmitted Still yet, in a feature of this aspect, a portion of a time interval T of the mesh network, during which interval mesh networking communications are performed, is measured beginning with a time of the wake-up broadcast, whereby all nodes participating in the mesh network are synchronized for mesh communications. The time of the wake-up broadcast may be the time of initial transmission of the wake-up broadcast In another aspect, a method of activating two mesh networks for independent and separate mesh network communications includes the steps of: transmitting a first wake-up broadcast that includes a first wake-up identifier such that each second receiver of each data communication device identified by the first wake-up identifier, upon receiving the first wake-up broadcast, will activate the two-way communications component of the data communication device, and thereafter the data communication device will engage in mesh networking communications via a first mesh network; and transmitting a second wake-up broadcast that includes a second wake-up identifier such that each second receiver of each data communication device identified by the second wake-up identifier, upon receiving the second wake-up broadcast, will activate the two-way communications component of the data communication device, and thereafter the data communication device will engage in mesh networking communications via a second mesh network.

In a feature of this aspect, the second wake-up broadcast is transmitted after transmitting the first wake-up broadcast such that a portion of a first time interval $T_1$ of the first mesh network, during which mesh networking communications are performed, does not overlap with a portion of a second time interval $T_2$ of the second mesh network, during which mesh networking communications are performed.

In further features of this aspect, the method also includes the step of transmitting a third broadcast that includes a third identifier such that the two-way communications component of each data communication device identified by the first wake-up identifier, upon receiving the third broadcast, will cease its mesh networking communications and will return to the dormant state; and the step of transmitting a fourth broadcast that includes a fourth identifier such that the two-way communications component of each data communication device identified by the second wake-up identifier, upon receiving the fourth broadcast, will cease its mesh networking communications and will return to the dormant state.

In another feature, the method further includes the step of transmitting a third broadcast that includes a third identifier such that the two-way communications component of each data communication device identified by either of the first wake-up identifier or the second wake-up identifier, upon receiving the third broadcast, will cease its mesh networking communications and will return to the dormant state.

In yet another aspect of the invention, a method of activating a mesh network for mesh network communications includes the step of transmitting a wake-up broadcast that includes a wake-up identifier such that each second receiver of each data communication device identified by the wake-up identifier, upon receiving the wake-up broadcast, activates the two-way communications component of the data communication device, and thereafter the data communication device will engage in mesh networking communications.

In still another aspect of the invention, an ad hoc mesh networking system includes an ad hoc mesh network utilizing a plurality of data communication devices as nodes of the network; wherein each data communication device includes both a two-way communications component, comprising a first receiver and transmitter, and a second receiver, wherein the second receiver activates the two-way communications component from a dormant state upon receipt by the second receiver of a wake-up broadcast that includes a wake-up identifier of the data communication device; and wherein a mesh network is activated for mesh network communications by transmitting a wake-up broadcast that includes a wake-up identifier such that each second receiver of each data communication device identified by the wake-up identifier, upon receiving the wake-up broadcast, will activate the two-way communications component of the data communication device, and thereafter the data communication device will engage in mesh networking communications.

In yet still another aspect of the invention, a data communication device for utilization as a node in an ad hoc mesh network includes a two-way communications component comprising a first receiver and transmitter; and a second receiver, wherein the second receiver activates the two-way communications component from a dormant state upon receipt by the second receiver of a wake-up broadcast that includes a wake-up identifier of the data communication device; wherein a mesh network is activated for mesh network communications by transmitting a wake-up broadcast that includes a wake-up identifier such that each second receiver of each data communication device identified by the wake-up identifier, upon receiving the wake-up broadcast, will activate the two-way communications component of the data communication device, and thereafter the data communication device will engage in mesh networking communications.

Another aspect of the invention includes computer executable instructions stored in a computer readable medium for performing any of the foregoing aspects and features, including any combinations thereof.

In addition to the aforementioned aspects and features of the invention, it should be noted that the invention further includes the various possible combinations of such aspects and features, including the combinations of such aspects and features with those aspects and features of the incorporated references from which priority is claimed.

BRIEF DESCRIPTION OF THE DRAWINGS

One or more preferred embodiments of the present invention now will be described in detail with reference to the accompanying drawings, wherein:

FIG. 2A is a timing diagram illustrating the use of periodic event-related communication, triggered by a common designation wake-up broadcast, by the nodes in FIGS. 1A-1D communicating with each other in a mesh network;

FIG. 2B is a timing diagram illustrating a first example of a communication event of the type generically illustrated in FIG. 2A;

FIG. 2C is a timing diagram illustrating a second example of a communication event of the type generically illustrated in FIG. 2A;

FIG. 2D is a timing diagram illustrating the completion of two successive communication events in the group of nodes of FIGS. 1A-1D;

DETAILED DESCRIPTION

Figure 1A:
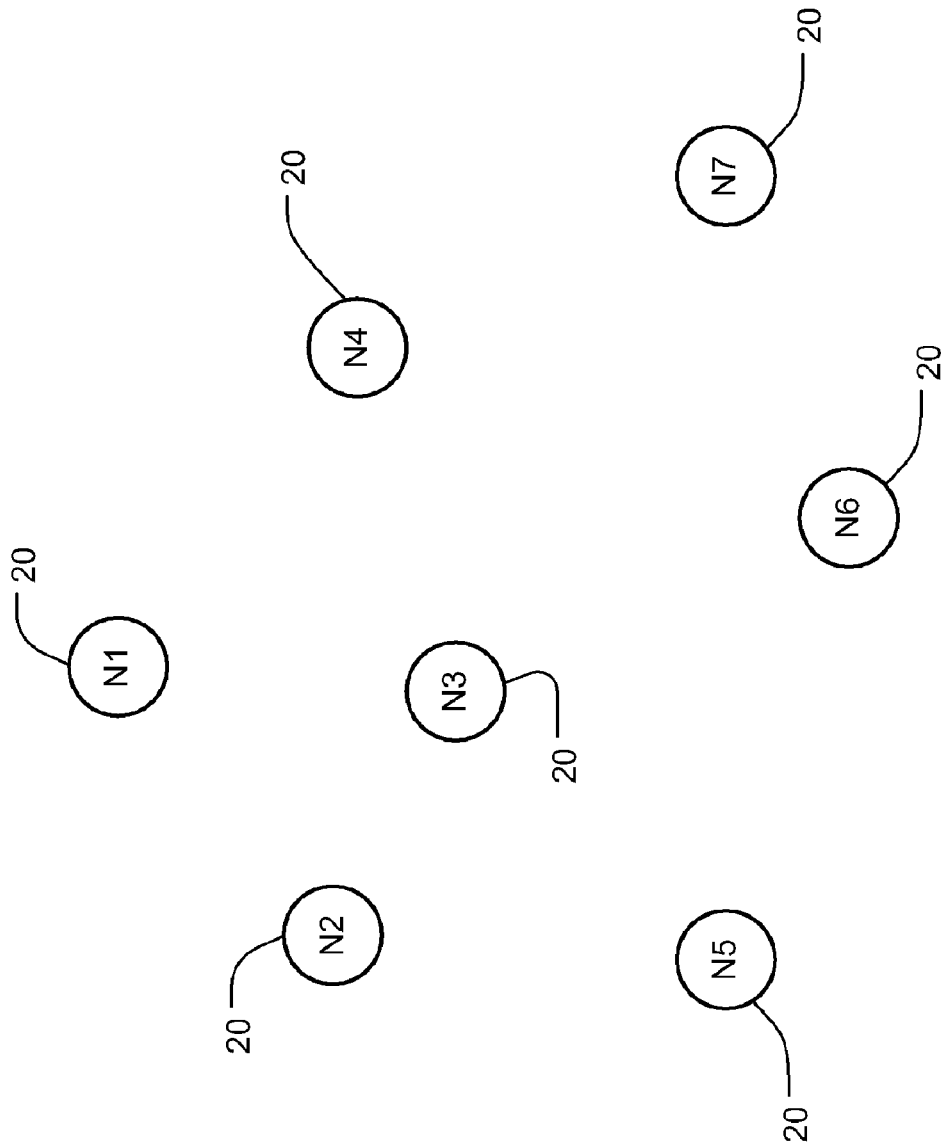
FIGS. 1A-1D are schematic diagrams illustrating the use of common designation wake-up broadcasts or signals, shown propagating through a group of participating nodes, to control the operation of a common designation mesh network in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its applications, or uses.

FIGS. 1A-1D are schematic diagrams illustrating the use of a common designation wake-up broadcast, shown propagating through a group of participating nodes 20, to control the operation of a mesh network 10 in accordance with one or more preferred embodiments of the present invention.

In this respect, a "node" refers to a wireless radio frequency data communication device that comprises a two-way communications component in the form of a transceiver that receives and transmits information wirelessly with one or more other nodes. The data communication device preferably includes a low-power radio frequency ("LPRF") data communication device that communicates via data packets. The transmission of the data packets may utilize, for example, transmission control protocol ("TCP"). The two-way communications component of the data communication device also preferably is standards-based radio ("SBR") and comprises, for example, a WiFi, WiMAX, CDMA, WCDMA, GSM, Zigbee®, Ultra-Wideband, or Bluetooth radio. Indeed, in connection with the one or more preferred embodiments described below, the SBR preferably comprises a Bluetooth radio.

The data communication device of a node of the wireless network may be mobile or fixed at a particular location, and the data communication device may include an internal power supply source or utilize an external power supply source. The data communication device also may include an interface for communicating with an associated sensor or other data acquisition device, which sensor may or may not form part of the node. The data communication device constituting the node also or alternatively may be attached to an asset that is to be monitored and/or tracked; alternatively, the data communication device constituting the node may be permanently affixed to a structure for monitoring and/or tracking assets that come within proximity thereto.

In accordance with the invention, the nodes utilize common designation networking in combination with wake-up technologies. Common designation networking is perhaps best disclosed in the incorporated U.S. Pat. Nos. 6,745,027 and 7,221,668. When the nodes are associated with assets, common designation identifiers representing attributes or characteristics of the assets are typically used, which common designations often are referred to as "class" designations. Similarly, ad hoc networks formed based thereon are often referred to as "class-based" networks and communications in such networks are often referred to as "class-based" communications. In accordance with common designation networking, a node screens each transmission for a data identifier that represents a common designation of that node. The node does not process, route, or respond to an incoming transmission if the data identifier is not found. As will be appreciated, common designation networking greatly reduces RF noise when many nodes are within broadcast range of each other and greatly increase operating life of mobile nodes that dependent on battery sources, as the nodes do not needlessly respond to all transmissions, filtering out and processing, routing, and/or responding to only those transmission bearing its common designation.

As further disclosed in the incorporated references, it will be appreciated that a node may have more than one common designation at any given time, and that a common designation may represent a subset or a superset of another common designation (sometimes referred to as class and subclass).

The wake-up technologies that are utilized in accordance with the invention are perhaps best disclosed in U.S. Pat. No. 7,209,771 and U.S. Patent Appl. Publication No. 2006/0287008. These two incorporated references disclose alternative approaches for the wake-up technologies that may be used.

Specifically, in incorporated U.S. Pat. No. 7,209,771, each node of the wireless ad hoc network includes—in connection with the SBR—a wake-up receiver that listens for a wake-up broadcast that includes a common designation of that node. Upon receiving such a wake-up broadcast, the wake-up receiver provides an electronic signal that activates the SBR, which resides in a dormant state (either off or in a reduced power standby mode) while the wake-up receiver is listening for an applicable broadcast. The wake-up receiver is a simplified receiver that draws much less current when listening for an applicable broadcast compared to the current that would be drawn by the SBR when listening for an applicable broadcast. Hence, significant power conservation and long battery life is achieved using such a wake-up receiver.

Furthermore, this wake-up receiver may screen only for a predetermined common designation, as disclosed in U.S. Patent Appl. Publication No. 2006/0287008. Alternatively, a more complicated stepped wake up of the SBR may be performed using the wake-up receiver, wherein the wake-up receiver first screens for one or more criteria before screening for the common designation in the wake-up broadcast. Such a stepped wake-up methodology is disclosed, for example, in the incorporated U.S. Patent Appl. Publication No. US 2006/0276161. Screening for criteria that is indicative of an actual wake-up broadcast being received can be beneficial when significant RF noise is present, whereby false indications of the receipt of a wake-up broadcast can be reduced.

In incorporated U.S. Patent Appl. Publication No. 2006/0287008, a wake-up transceiver is disclosed. The wake-up transceiver is similar to the aforementioned wake-up receiver, but further includes a transmitter by which a wake-up broadcast may be transmitted without necessarily having to activate the SBR. In the data communication devices of U.S. Pat. No. 7,209,771, the SBR sends a wake-up broadcast whereas, in U.S. Patent Appl. Publication No. 2006/0287008, the wake-up broadcast may be sent by the wake-up transceiver without having to activate the SBR. Avoiding booting up of the SBR has been found to result in significant power savings, and while the SBR has additional features and functionality not provided by the wake-up transceiver, such features and functionality is not required in transmitting a wake-up broadcast.

As used herein, "wake-up component" is intended to mean either a wake-up receiver or wake-up transceiver, as disclosed in these incorporated references, and each node of FIG. 1 preferably includes such a wake-up component.

Returning to FIG. 1, a common designation wake-up broadcast is shown by dashed arrows originating from node 20 labeled "N1." The wake-up broadcast includes a wake-up identifier that preferably corresponds to a common designation shared by two-way communication components of the nodes forming a common designation mesh network. Each two-way communications component of each node illustrated in the drawings includes an exemplary standards-based radio comprising a Bluetooth radio, and two-way Bluetooth communications between the two-way communications components are indicated by solid double arrow lines with the label "BT". Each node further preferably includes a wake-up receiver or wake-up transceiver (i.e., a "wake-up component") that activates the two-way communication component from its dormant state upon receipt of a wake-up broadcast that includes a common designation of the node.

The nodes 20 preferably remain in a dormant state, shown in FIG. 1A, until a communication event occurs. During this time the mesh network is considered to be deactivated or "off". In at least one embodiment, the nodes 20 generally remain in a dormant state and wake up only when such a communication event 30 occurs, while in at least one other embodiment, the nodes 20 may also wake-up periodically, too.

Figure 1B:
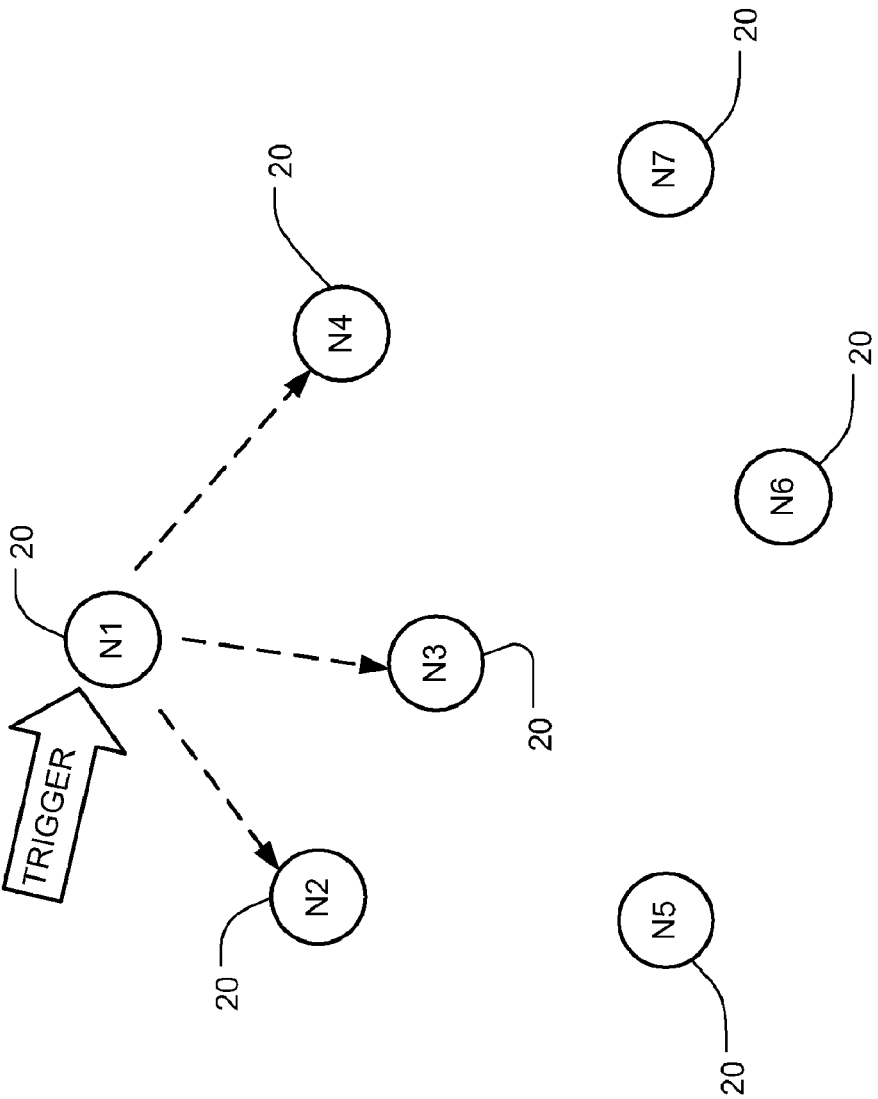

A communication event 30 is shown as occurring at the node 20 labeled "N1" in FIG. 1B. As a result, mesh network communications are required, and so the node N1 wakes up and transmits a wake-up broadcast to activate or "turn on" a common designation mesh network. As shown in FIG. 1B, the initial wake-up broadcast sent by the node 20 designated N1 is received only by those nodes 20 within range of the initial wake-up identifier signal, i.e., by the nodes 32 designated N2, N3 and N4. This may be referred to as a first wave of wake-ups. Furthermore, the dashed arrows illustrated in FIG. 1B (and the remainder of the drawings) serve to indicate a wake-up broadcast that is received and processed by the indicated node resulting in the waking up of such node. For those nodes that receive but do not respond to a wake-up broadcast by waking up, the dashed arrows are not illustrated in the drawings in order to preserve clarity of illustration.

Figure 1C:
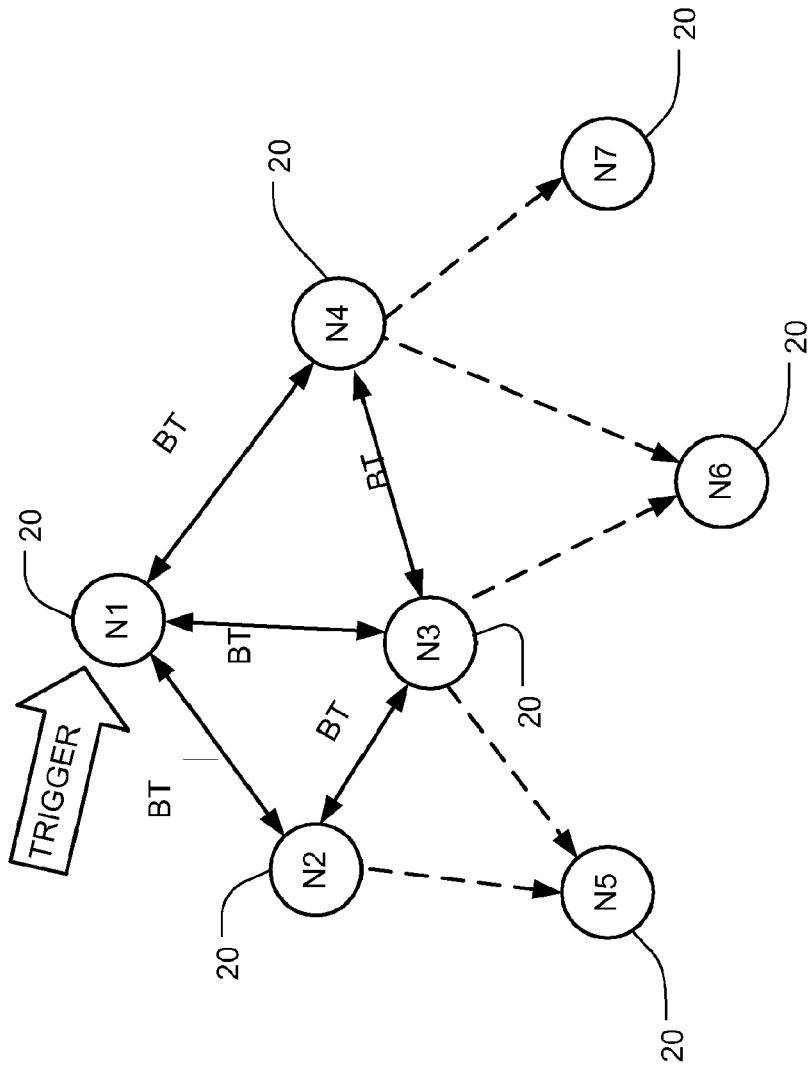
Figure 1D:
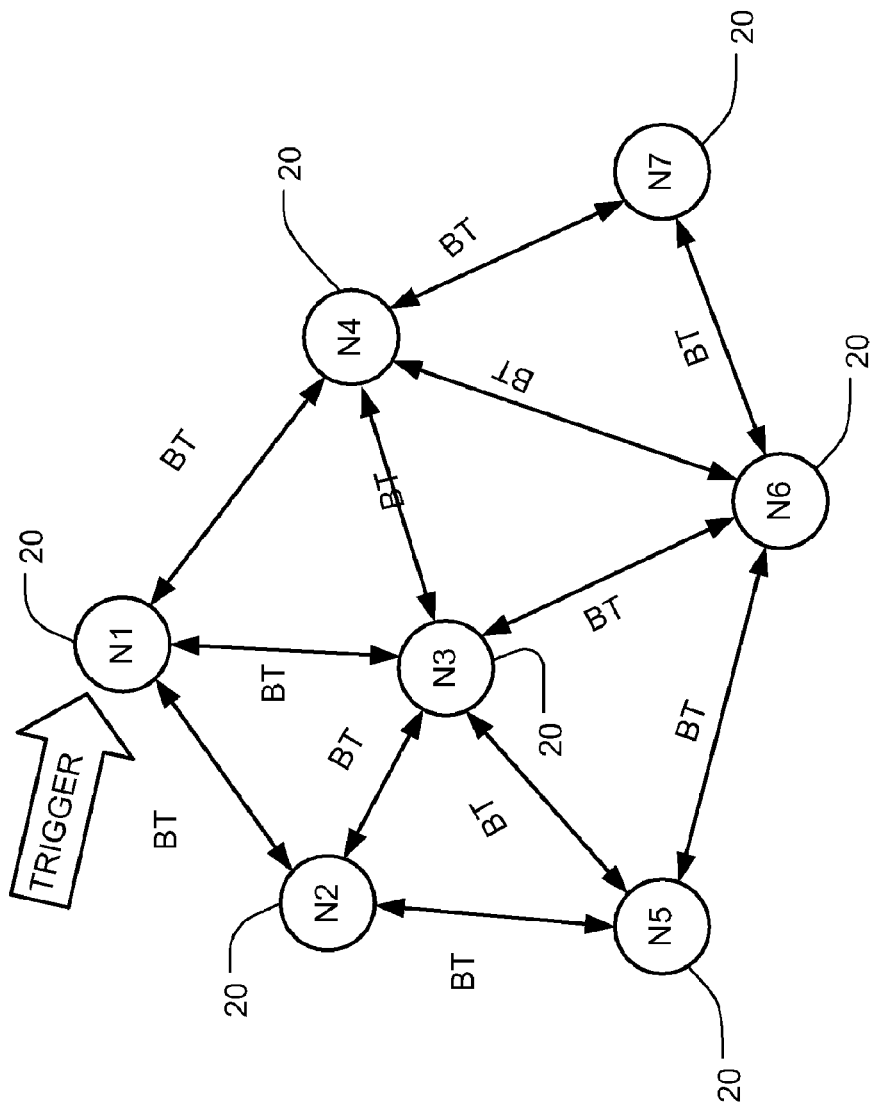

As shown in FIG. 1C, the nodes 20 in the first wave of wake-ups (i.e., within range of the initial wake-up identifier signal) in turn propagate the wake-up broadcast to the nodes 20 within their range and establish Bluetooth communications with the nodes that have awoken, thereby activating the mesh network 10. The wake-up of the nodes designated N5, N6 and N7 that occurs because of the propagation of the wake-up broadcast may be referred to as a second wave of wake-ups. Preferably, any node 20 that has already received the wake-up broadcast will not propagate the broadcast again. Ultimately, all of the nodes 20 in the common designation identified in the wake-up broadcast 32 via the wake-up identifier are awakened and, as a result, the mesh network 10 is "up and running" in a conventional mesh networking manner as shown in FIG. 1D.

FIG. 2A is a timing diagram illustrating the use of periodic event-related communication, triggered by a common designation wake-up broadcast 32, by the nodes 20 in the mesh network 10.

Importantly, the wake-up broadcast 32, labeled "W" in FIGS. 2A-2D, serves as a means for "synchronizing" the nodes 20 forming the common designation mesh network 10. In other words, the wake-up broadcast 32 causes each node 20 in the network 10 to be prepared to participate in individual node communication 34, labeled "IRC," using the two-way communications component (or SBR) of the node, during a designated portion of each predetermined period, labeled "T," following the wake-up broadcast 32. The wake-up broadcast synchronizes the nodes in that the predetermined period "T" is keyed off of the wake-up broadcast. This is shown generically in FIG. 2A as occurring for any number of periods after the wake-up broadcast 32. However, it will be appreciated that many communication events 30 may last for only a single period, as shown in the communication event 30 labeled "Event A" in FIG. 2B, or for two periods, as shown in the communication event 30 labeled "Event B" in FIG. 2C.

It will be appreciated that longer communication events 30, i.e., those that require multiple periods to complete, may be long enough that individual nodes 20 may enter or leave the mesh network 10 during the event 30. For this reason, it may be useful, during longer events 30, to retransmit the wake-up broadcast 32 (not illustrated) periodically to activate and synchronize any nodes 20 that arrive after the initial start of the event 30 (or that arrive after the last synchronizing wake-up broadcast 32 in the event 30).

As noted previously, once awakened, each node 20 in the network 10 remains prepared to participate in individual node communication 34 pertaining to the respective communication event 30 during a designated portion of each predetermined period following the wake-up broadcast 32 until the event 30 is over. Generally, the event 30 is over when the necessary individual node communication 34 is complete. In at least some embodiments, a message may be sent by the originating node N1, via the final individual node communication 34, once the event 30 is complete, in order to end the transmissions and place all of the nodes back into the dormant state described above to await another common designation wake-up broadcast 32 that signifies the beginning of another event 30. Thus, as will now be appreciated, the periodic communications during interval T in the mesh nodes only occurs during a communication event and, when no communication event is occurring, no transmissions are made in the mesh network, even if such period of inactivity exceeds interval T. Using wake-up broadcasts, the operation of the mesh network in an otherwise conventional manner can be turned off and on as needed.

FIG. 2D is a timing diagram illustrating the completion of two successive communication events 30 in the group of nodes 20 of FIGS. 1A-1D. In each event, a wake-up broadcast 32 is propagated to initiate and synchronize a network 10, and individual node communication 34 is carried out as necessary to complete the event 30. Each event, referred to generically as node communication or "RC," includes one or more periods of individual node communication 34. In FIG. 2D, the first event 30, designated Event A, is only a single period in length, while the second event 30, designated Event B, is two periods in length. It will be appreciated that each event 30 involves the creation of a common designation ad hoc mesh network 10, and that the group of nodes 20 participating in the network 10 during the first event 30 may or may not be exactly the same as the group of nodes 20 participating in the network 10 during the second event 30, and in fact that the makeup of the group of participating nodes 20 may even change during a particular event 30, particularly a longer one.

Figure 3A:
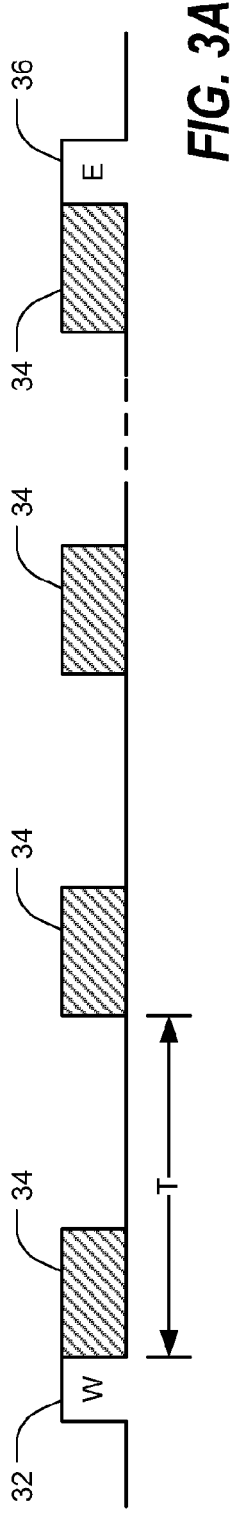
FIG. 3A is a timing diagram illustrating the use of periodic event-related communication, triggered and terminated by common designation wake-up broadcasts, by the nodes in FIGS. 1A-1D communicating with each other in a mesh network.

FIG. 3A is a timing diagram illustrating the use of periodic event-related communication, triggered and terminated by common designation wake-up broadcasts 32,36, by the nodes 20 in FIGS. 1A-1D communicating with each other in a mesh network 10. As with the operation illustrated in FIGS. 2A-2D, a wake-up broadcast 32, labeled "W" in FIGS. 3A-3C, serves to activate the two-way communication components of the nodes (having the targeted common designation identified in the wake-up broadcast) from a dormant state, and further serves as a means by which the awaken nodes 20 can synchronize the time interval T for conventional mesh network communications. In other words, the wake-up broadcast 32 causes each node 20 in the network 10 to be prepared to participate in individual node communication 34, labeled "IRC," such as by standards-based radio, during a designated portion of each predetermined period following the wake-up broadcast 32. The wake-up broadcast 32 is propagated through the nodes 20 in the manner shown in FIGS. 1A-1D and described above. Any node 20 that has already received the wake-up broadcast can resynchronize its timer, and any node 20 that has not heard the wake-up broadcast can add itself to the network 10. As with the communication described previously, during longer events 30, the wake-up broadcast 32 may be retransmitted periodically (not illustrated) to activate and synchronize any nodes 20 that arrive after the initial start of the event 30 (or that arrive after the last synchronizing wake-up broadcast 32 in the event 30)

Figure 3B:
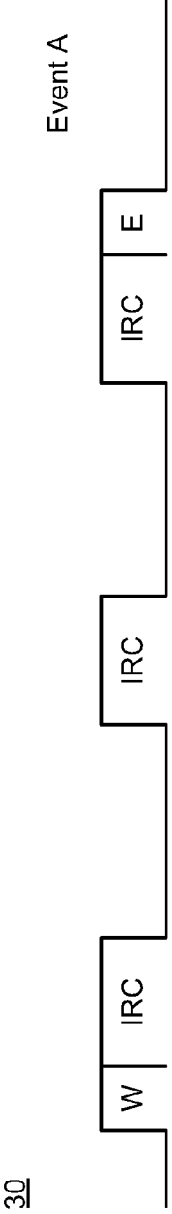
FIG. 3B is a timing diagram illustrating an example of a communication event of the type generically illustrated in FIG. 3A.
Figure 3C:
FIG. 3C is a timing diagram illustrating the completion of two successive communication events in the group of nodes of FIGS. 1A-1D.

In addition, however, a wake-up broadcast 36 may be utilized to terminate the event 30, break the event 30 up into multiple sequences or delay the completion of the event 30 given application requirements. Such a wake-up broadcast 36, labeled "E," is illustrated in FIGS. 3A-3C. Such a signal 36 may or may not utilize the same common designation as the wake-up broadcast 32. In at least some embodiments, the initial wake-up broadcast 32 includes the same identifier as the end "wake-up" signal 36, and the nodes 20 may be aware that the next wake-up broadcast is to be interpreted as an end signal rather than a new wake-up broadcast 32. In at least some other embodiments, a first identifier and a second identifier are assigned or configured in conjunction with each other, wherein both identifiers are assigned to the same group of nodes 20, and the first identifier is used in wake-up broadcasts 32 and the second identifier is used in end signals 36. A wide variety of approaches may likewise be utilized to accomplish this functionality.

Again, once awakened, each node 20 in the network 10 remains prepared to participate in individual node communication 34 pertaining to the respective communication event 30 during a designated portion of each predetermined period following the wake-up broadcast 32 until the event 30 is over, with the event 30 generally being over when the necessary individual node communication 34 is complete. However, unlike the approach described with regard to FIGS. 2A-2D, the event 30 is ended by transmitting a wake-up broadcast 36, generally sent by the originating node N1. The nodes 20 then return to the sleep state described above to await another common designation wake-up broadcast 32 that signals the beginning of another event 30.

FIG. 3B is a timing diagram illustrating an example of a communication event of the type generically illustrated in FIG. 3A. In this example, the communication event 30 lasts two periods and part of a third, with an end signal 36 being used to terminate the event 30. FIG. 3C is a timing diagram illustrating the completion of two successive communication events 30 in the group of nodes 20 of FIGS. 1A-1D. In each event, a wake-up broadcast 32 is propagated to initiate and synchronize a network 10, individual node communication 34 is carried out as necessary to accomplish the purpose of the event 30, and then an end signal 36 is propagated to terminate the event and quickly put each node 20 back into a sleep state. In FIG. 3C, the first event 30, designated Event A, is two periods and part of third in length, as shown in FIG. 3B, while the second event 30, designated Event B, would be of whatever length necessary to accomplish the purpose of the event 30. Once again, it will be appreciated that each event 30 involves the creation of a common designation ad hoc mesh network 10, and that the group of nodes 20 participating in the network 10 during the first event 30 may or may not be exactly the same as the group of nodes 20 participating in the network 10 during the second event 30, and in fact that the makeup of the group of participating nodes 20 may even change during a particular event 30, particularly a longer one.

Common designations used as identifiers preferably are used to sort the nodes 20 into a plurality of mesh networks. Moreover, the common designations may be based on various performance factors, including, for example, throughput of the node, strength of the RF link, range (using values in the node such as Received Signal Strength Indication, or "RSSI"), and other characteristics that could affect overall performance. The nodes 20 measure these parameters and activate common designations stored in tables on the nodes 20 thereby allowing network 110 to be selectively formed based on desired network performance metrics.

Figure 4A:
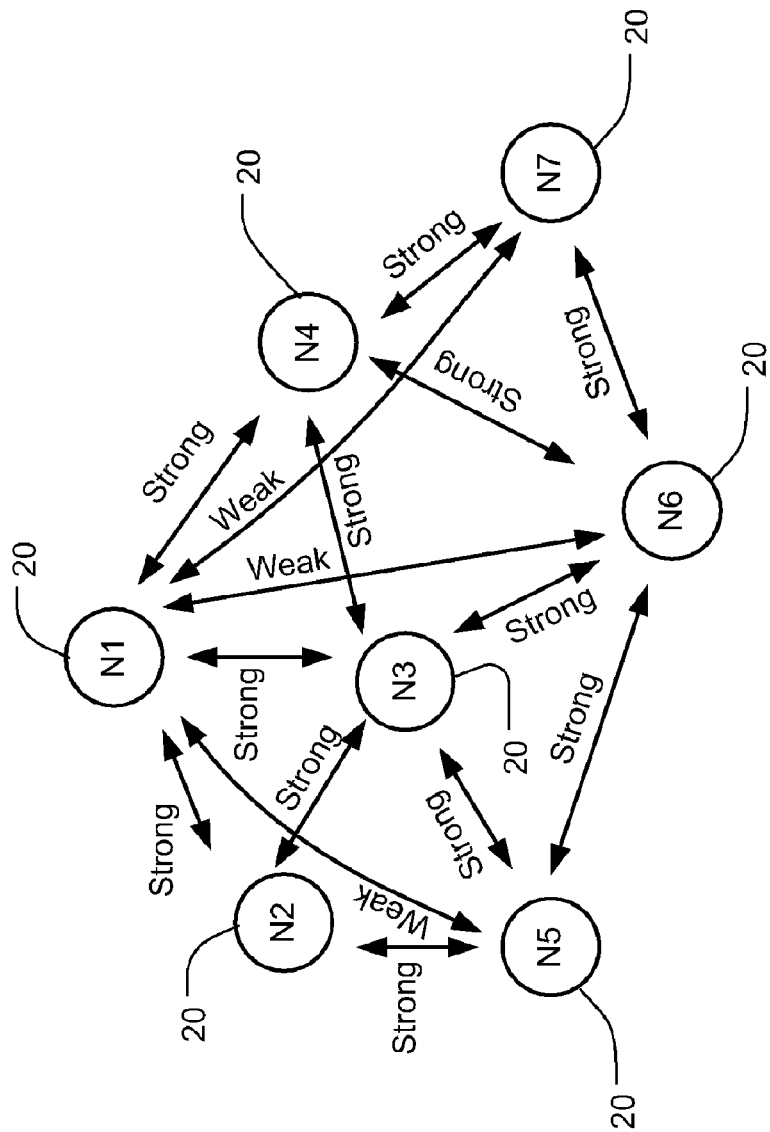
FIG. 4A is a schematic diagram illustrating the relative signal strengths in a group of participating nodes in a mesh network.

For instance, nodes 20 with weaker signal strengths can be triggered with the expectation of sending data across a longer distance with a fewer number of hops. FIG. 4A is a schematic diagram illustrating the relative signal strengths in a group of participating nodes 20 in a mesh network 10 that has been formed using all nodes N1 through N7. In accordance with one or more preferred embodiments of the present invention, two or more common designations may be provided and activated in each node's common designation table, as conditions change, based on the relative signal strengths found in node-to-node communications. In the illustrated example, common designations are established, one for "stronger" signal strength and one for "weaker" signal strength relative to the triggering node N1 20, with the mesh network that is formed with (N1 being the originating node) based on a wake-up broadcast having a "weaker" signal strength designation that is transmitted by node N1.

Figure 4B:
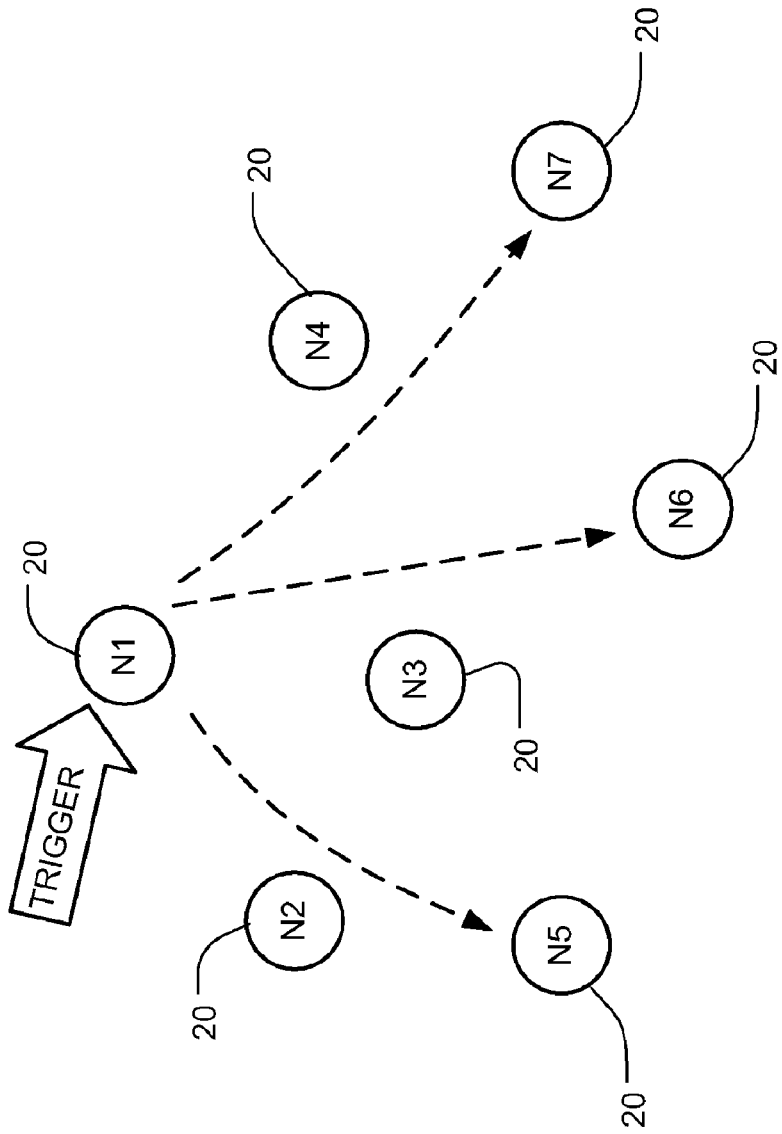
FIGS. 4B-4C are schematic diagrams illustrating the use of common designations based on relative signal strengths, and the resulting common designation mesh network formed based on a weak signal designation, in accordance with one or more preferred embodiments of the present invention.

In particular, the nodes 20 may remain in a dormant state until a communication event 30 occurs, shown in FIG. 4B as being triggered at the node 20 labeled "N1." A common designation wake-up broadcast that identifies, for example, only the weaker signal strength is be transmitted as shown in FIG. 4B. Although received by all of the other nodes 20, labeled "N2" through "N7," the only nodes 20 that are awakened are the three nodes 20, labeled "N5," "N6" and "N7," in the weaker signal range. The receiving nodes 20 in the stronger signal range, which are the ones labeled "N2," "N3" and "N4," are not in the "weak signal" class and thus remain in a dormant state. The nodes 20 in the first wave of wake-ups, i.e., those labeled "N5," "N6" and "N7," start their communication sequence by transmitting the wake-up identifier to the nodes 20 within their range, thereby propagating and initiating the network 110. Some nodes 20 (not illustrated) may receive the wake-up broadcast for the first time, while the node 20 labeled "N1" is already awake. Again, the receiving nodes 20 in the stronger signal range, which are again the ones labeled "N2," "N3" and "N4," are not in the "weak signal" common designation and thus still remain in a dormant state, but full communication is established with the node 20 labeled "N1," as shown in FIG. 4C.

In addition, nodes with higher bit error rates ("BER") could also be chosen to chose longer hops. This technique would minimize delay and move smaller amounts of data through the network 210 quickly. Alternatively, if higher bandwidth is required, a wake-up could choose strong RF links to minimize retransmissions. Further, direct node links could be established between two points, thus optimizing data throughput.

Figure 4C:
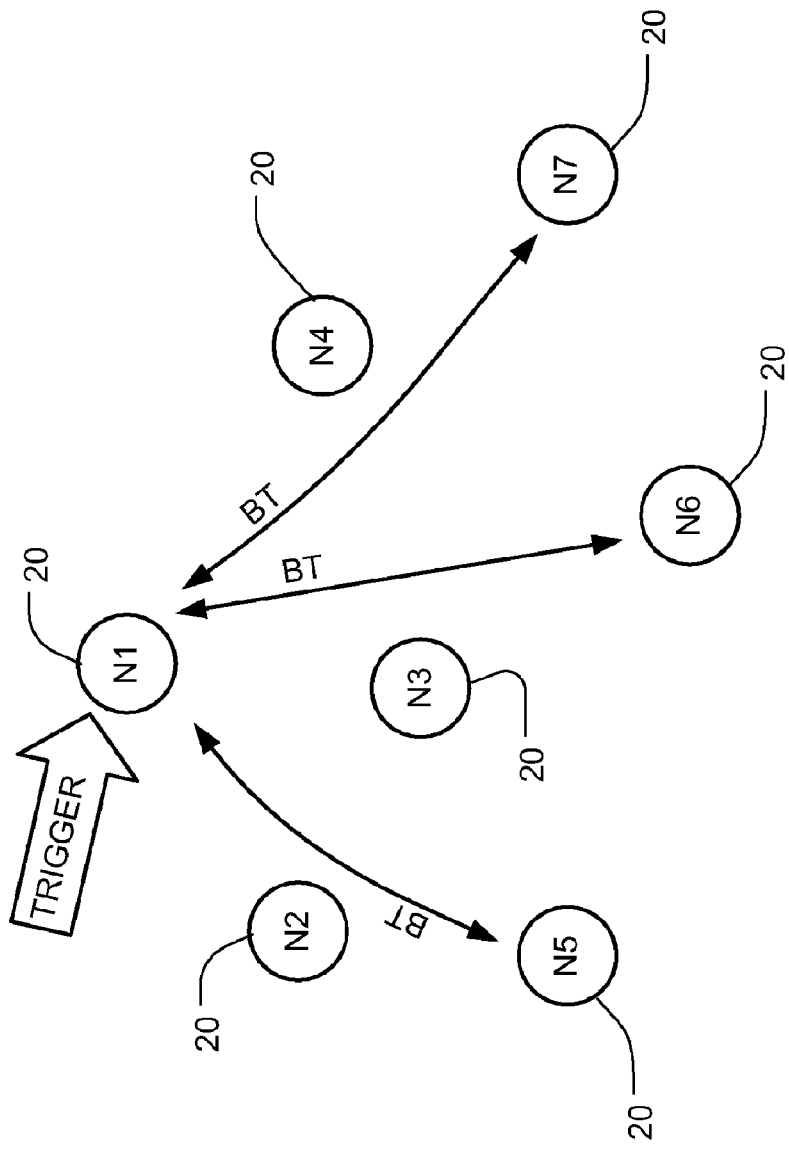
Figure 5:
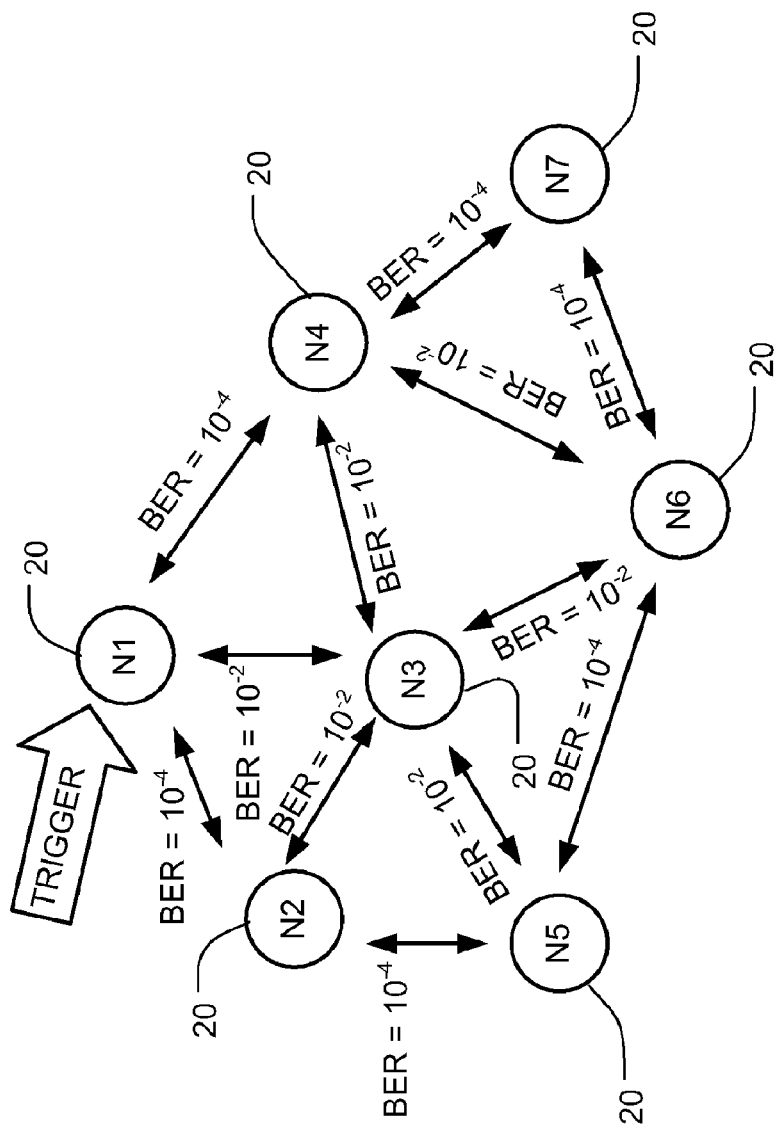
FIG. 5 is a schematic diagram illustrating the bit error rate (BER) in a group of participating nodes in a mesh network, whereby BER may be used to establish common designations for forming common designation mesh networks, in accordance with one or more preferred embodiments of the present invention.

FIG. 5 is a schematic diagram illustrating relative throughput of node-to-node communications which could be used in defining common designations, similar to the example in FIGS. 4B-4C that used relative signal strength. In this regard, nodes 20 would keep track of the bit error rate for communications with each other node 20 and respond to wake-ups based on the that configure the network 210 based on network throughput parameters. As illustrated, communication event 30 occurs at the node 20 labeled "N1," and nodes 20 that would be used to form the "low BER" mesh network 210 would be those labeled "N1," "N4," "N7," "N6," "N2" and "N5" This sorting lowers the number of nodes 20 in the mesh 210, thereby reducing noise and minimizing RF transmissions. The network 210 can then be configured to satisfy the event 30 based, for example, on the size of the file transfer.

It will be appreciated that common designations may further configured using a combination of network parameters. For example, four common designations may be established, wherein a first common designation is configured for strong signal strength and high throughput, a second common designation is configured for weak signal strength and high throughput, a third common designation is configured for strong signal strength and low throughput, and a fourth common designation is configured for weak signal strength and low throughput. A wide variety of combinations and approaches may likewise be utilized without departing from the scope of the present invention.

It will also be appreciated that the use of classes configured in correspondence with any of the various network parameters, including for example the signal strength or throughput illustrated herein, or combination thereof, may be used to control the operation of a mesh network 10,110,210 by controlling the triggering and synchronization of communications as described previously.

Figure 6:
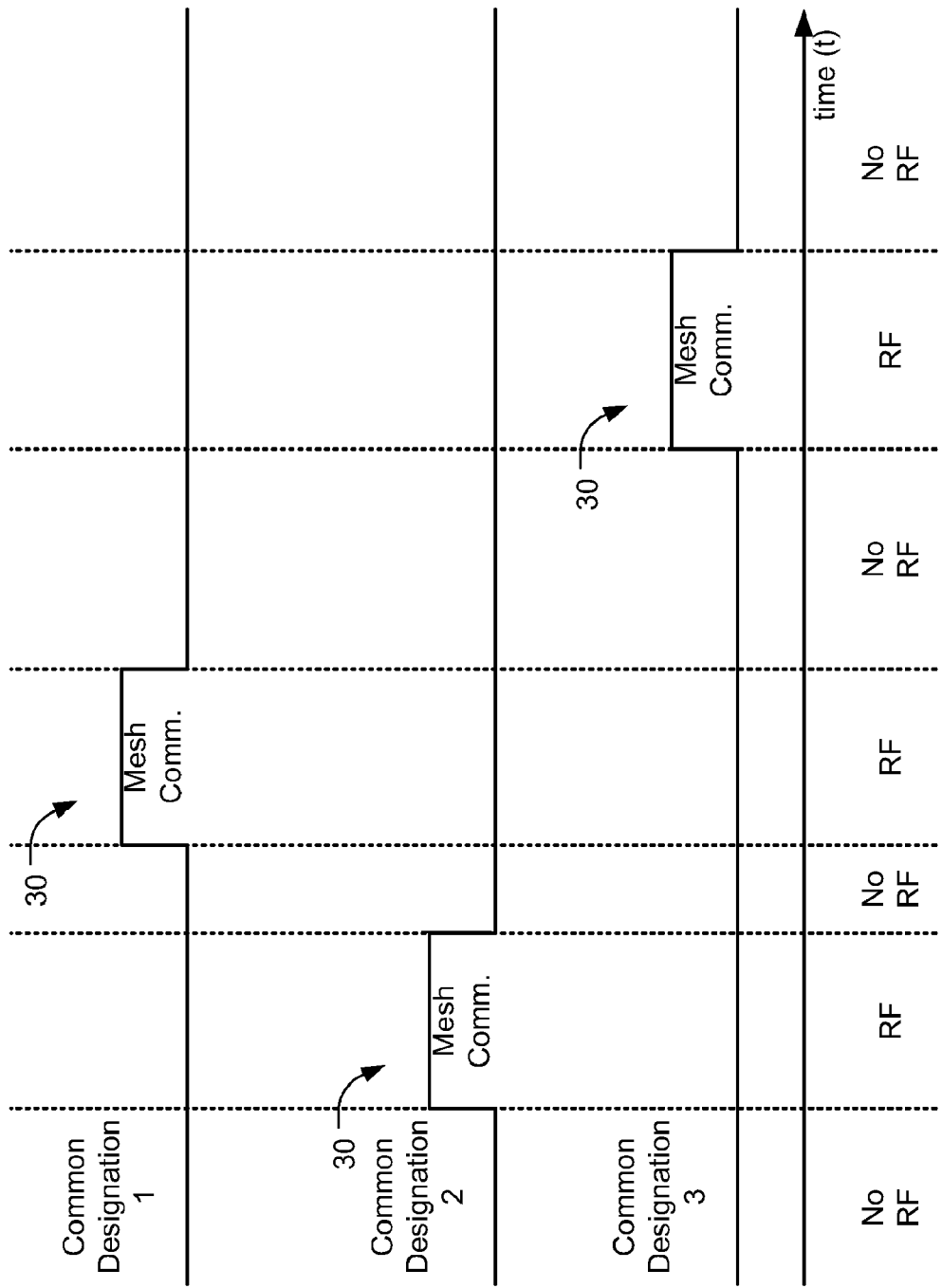
FIG. 6 is a timing diagram illustrating the use of the techniques described herein in avoiding the simultaneous occurrence of communication events on two or more different common designation mesh networks.

FIG. 6 is a timing diagram illustrating the use of the techniques described herein in avoiding the simultaneous occurrence of communication events 30 on two or more different common designation networks 10. Typically, because server communications, triggered sensors, and the like occur semi-randomly in time, nodes in a mesh network are transmitting at different intervals. However, using a wake-up node or the mesh node, a time slot can be assigned so that fewer collisions occur. For example, nodes 20 in a first common designation may wait until mesh network communications between nodes 20 in a second common designation are complete before initiating their own mesh network communications, and nodes 20 in a third common designation may wait until mesh network communications between nodes 20 in the first common designation are complete before initiating their own mesh network communications. The mesh communications in the nodes of the first and third common designations, respectively, may be initiated and synchronized using the techniques described herein. In conjunction with this, means may be provided for recognizing that nodes 20 in another common designation are currently communicating, thereby delaying the triggering of an event 30. Such means may themselves utilize wake-up identifiers or any other means. The end result is that, as shown in FIG. 6, in many situations, the mesh communications do not collide with each other, thereby improving reception and throughput.

The method of the present invention has many advantages. It enables the ability to turn parts of the network on and off to optimize throughput. It reduces RF noise so that throughput can be significantly improved. It enables direct connect of nodes and node resources. It enables the use of Class 1 Bluetooth radios (average 300 ft range) as opposed to Class 2 Bluetooth radios (average 100 ft range) since the nodes are in a low power wake-up mode most of the time. It enables tighter control of nodes thereby enabling network formation based on application and/or environment. It also enables the transmission to be offset in time thereby reducing collisions and RF noise. In addition, RF noise is significantly reduced, and RF collisions are minimized thereby enabling lower BER and increasing usable data throughput.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method of activating and deactivating a mesh network for mesh network communications in ad hoc mesh networking utilizing a data communication device for each of a plurality of network nodes, each data communication device including both,
    a two-way communications component comprising a first receiver and transmitter, and
    a second receiver,
    wherein the second receiver activates the two-way communications component from a dormant state upon receipt by the second receiver of a wake-up broadcast that includes a wake-up identifier of the data communication device, wherein the method comprises:
    tracking, at each of the network nodes, one or more metrics related to communications with other network nodes;
    transmitting a first wake-up broadcast that includes a first wake-up identifier such that each second receiver of each data communication device identified by the first wake-up identifier, upon receiving the first wake-up broadcast, will activate the two-way communications component of the data communication device, and thereafter the data communication device will engage in mesh networking communications;
    propagating, by each data communication device that receives the first wake-up broadcast, the first wake-up broadcast;
    periodically retransmitting the first wake-up broadcast that includes the first wake-up identifier such that each second receiver of each data communication device identified by the first wake-up identifier, upon receiving the first wake-up broadcast, will activate the two-way communications component of the data communication device, and thereafter the data communication device will engage in mesh networking communications;
    transmitting a second broadcast that includes a second identifier such that the two-way communications component of each data communication device identified by the second identifier, upon receiving the second broadcast, will cease its mesh networking communications and will return to the dormant state;
    wherein each data communication device is configured such that, after receiving and propagating the first wake-up broadcast, the data communication device will not propagate that first wake-up broadcast again even if the first wake-up broadcast is received again; and
    wherein the first wake-up identifier represents a common designation corresponding to one or more of the tracked one or more metrics related to communications with other network nodes.

2. The method of claim 1, wherein the second broadcast is transmitted by the first transmitter of the two-way communications component of one of the data communication devices.

3. The method of claim 1, wherein the second receiver of one of the data communication devices is part of a wake-up transceiver of that data communication device, and wherein the second broadcast is transmitted by a second transmitter of the wake-up transceiver.

4. The method of claim 1, wherein the second broadcast is received by the first receiver of the two-way communications component of one of the data communication devices.

5. The method of claim 1, wherein the second broadcast is received by the second receiver of one of the data communication devices.

6. The method of claim 1, wherein the second receiver of one of the data communication devices is part of a wake-up transceiver of that data communication device, and wherein the second broadcast is received by the second receiver of the wake-up transceiver.

7. The method of claim 1, wherein the two-way communications component of each data communication device is off when in the dormant state.

8. The method of claim 1, wherein the second receiver of each data communication device draws substantially less current while listening for the first wake-up broadcast than the two-way communications component would draw while listening for the first wake-up broadcast.

9. The method of claim 1, wherein the second receiver of each data communication device draws less current while listening for the first wake-up broadcast than the two-way communications component would draw while listening for the first wake-up broadcast, the difference in current draw being at least an order of magnitude.

10. The method of claim 1, wherein the second receiver of one of the data communication devices utilizes a stepped wake-up sequence based on at least two criteria, and wherein the last criteria before awakening the two-way communications component comprises identifying the first wake-up identifier of that data communication device in the first wake-up broadcast.

11. The method of claim 1, wherein the second receiver of one of the data communication devices is part of a wake-up transceiver, the wake-up transceiver further comprising a second transmitter of that data communication device that is configured to transmit the first wake-up broadcast for receipt by another wake-up receiver of another data communication device.

12. The method of claim 1, wherein the first wake-up identifier represents a node performance characteristic.

13. The method of claim 12, wherein the performance characteristic comprises one of the group of bit error rate, throughput of the node, strength of the radiofrequency communication link, and range, determined using values such as Received Signal Strength Indication, or "RSSI".

14. The method of claim 1, wherein the mesh network that is activated comprises a subset of nodes out of a plurality of available nodes, the selection of nodes being determined based on the first wake-up identifier included in the first wake-up broadcast that is transmitted.

15. The method of claim 1, wherein a portion of a time interval T of the mesh network during which mesh networking communications are performed is measured beginning with a time of the first wake-up broadcast, whereby all nodes participating in the mesh network are synchronized for mesh communications.

16. A method of activating two mesh networks for independent and separate mesh network communications in ad hoc mesh networking utilizing a data communication device for each of a plurality of network nodes, each data communication device including both, a two-way communications component comprising a first receiver and transmitter, and
  a second receiver,
  wherein the second receiver activates the two-way communications component from a dormant state upon receipt by the second receiver of a wake-up broadcast that includes a wake-up identifier of the data communication device, wherein the method comprises:
  tracking, at each of the network nodes, one or more metrics related to communications with other network nodes;
  transmitting a first wake-up broadcast that includes a first wake-up identifier such that each second receiver of each data communication device identified by the first wake-up identifier, upon receiving the first wake-up broadcast, will activate the two-way communications component of the data communication device, and thereafter the data communication device will engage in mesh networking communications via a first mesh network;
  propagating, by each data communication device that receives the first wake-up broadcast, the first wake-up broadcast;
  periodically retransmitting the first wake-up broadcast that includes the first wake-up identifier such that each second receiver of each data communication device identified by the first wake-up identifier, upon receiving the first wake-up broadcast, will activate the two-way communications component of the data communication device, and thereafter the data communication device will engage in mesh networking communications via the first mesh network;
  transmitting a second wake-up broadcast that includes a second wake-up identifier such that each second receiver of each data communication device identified by the second wake-up identifier, upon receiving the second wake-up broadcast, will activate the two-way communications component of the data communication device, and thereafter the data communication device will engage in mesh networking communications via a second mesh network;
  wherein each data communication device is configured such that, after receiving and propagating the first wake-up broadcast, the data communication device will not propagate the first wake-up broadcast again even if the first wake-up broadcast is received again;
  wherein the first wake-up identifier represents a common designation corresponding to a first set of one or more of the tracked one or more metrics related to communications with other network nodes; and
  wherein the second wake-up identifier represents a common designation corresponding to a second set of one or more of the tracked one or more metrics related to communications with other network nodes.

17. The method of claim 16, wherein the second wake-up broadcast is transmitted after transmitting the first wake-up broadcast such that a portion of a first time interval $T_1$ of the first mesh network, during which mesh networking communications are performed, does not overlap with a portion of a second time interval $T_2$ of the second mesh network, during which mesh networking communications are performed.

18. The method of claim 16, further comprising transmitting a third broadcast that includes a third identifier such that the two-way communications component of each data communication device identified by the first wake-up identifier, upon receiving the third broadcast, will cease its mesh networking communications and will return to the dormant state.

19. The method of claim 18, further comprising transmitting a fourth broadcast that includes a fourth identifier such that the two-way communications component of each data communication device identified by the second wake-up identifier, upon receiving the fourth broadcast, will cease its mesh networking communications and will return to the dormant state.

20. The method of claim 16, further comprising transmitting a third broadcast that includes a third identifier such that the two-way communications component of each data communication device identified by either of the first wake-up identifier or the second wake-up identifier, upon receiving the third broadcast, will cease its mesh networking communications and will return to the dormant state.

21. A method of activating a mesh network for mesh network communications in ad hoc mesh networking utilizing a data communication device for each of a plurality of network nodes, each data communication device including both,
  a two-way communications component comprising a first receiver and transmitter, and
  a second receiver,
  wherein the second receiver activates the two-way communications component from a dormant state upon receipt by the second receiver of a wake-up broadcast that includes a wake-up identifier of the data communication device, wherein the method comprises:
  tracking, at each of the network nodes, one or more metrics related to communications with other network nodes;
  transmitting a particular wake-up broadcast that includes a particular wake-up identifier such that each second receiver of each data communication device identified by the particular wake-up identifier, upon receiving the particular wake-up broadcast, will activate the two-way communications component of the data communication device, and thereafter the data communication device will engage in mesh networking communications;

propagating, by each data communication device that receives the particular wake-up broadcast, the particular wake-up broadcast;

periodically retransmitting the particular wake-up broadcast that includes the particular wake-up identifier such that each second receiver of each data communication device identified by the particular wake-up identifier, upon receiving the particular wake-up broadcast, will activate the two-way communications component of the data communication device, and thereafter the data communication device will engage in mesh networking communications;

wherein each data communication device is configured such that, after receiving and propagating the particular wake-up broadcast, the data communication device will not propagate that particular wake-up broadcast again even if the particular wake-up broadcast is received again; and wherein the particular wake-up identifier represents a common designation corresponding to one or more of the tracked one or more metrics related to communications with other network nodes.

22. An ad hoc mesh networking system, comprising:

an ad hoc mesh network utilizing a plurality of data communication devices as nodes of the network;

wherein each data communication device includes both, a two-way communications component comprising a first receiver and transmitter, and a second receiver, wherein the second receiver activates the two-way communications component from a dormant state upon receipt by the second receiver of a wake-up broadcast that includes a wake-up identifier of the data communication device; and wherein each data communication device is configured to track one or more metrics related to communications with other network nodes;

wherein a mesh network is activated for mesh network communications by transmitting a first wake-up broadcast that includes a first wake-up identifier such that each second receiver of each data communication device identified by the first wake-up identifier, upon receiving the first wake-up broadcast, will activate the two-way communications component of the data communication device, and thereafter the data communication device will engage in mesh networking communications;

wherein each data communication device is configured to propagate the received first wake-up broadcast, but is configured such that, after receiving and propagating the received first wake-up broadcast, the data communication device will not propagate the received first wake-up broadcast again even if the received first wake-up broadcast is received again;

wherein the first wake-up identifier represents a common designation corresponding to one or more of the tracked one or more metrics related to communications with other network nodes.

23. A data communication device for utilization as a node in an ad hoc mesh network utilizing a plurality of data communication devices as nodes, wherein the data communication device comprising:

a two-way communications component comprising a first receiver and transmitter; and a second receiver, wherein the second receiver activates the two-way communications component from a dormant state upon receipt by the second receiver of a wake-up broadcast that includes a wake-up identifier of the data communication device;

wherein the data communication device is configured to track one or more metrics related to communications with other network nodes;

wherein the ad hoc mesh network is activated for mesh network communications by transmitting a first wake-up broadcast that includes a first wake-up identifier such that each second receiver of each data communication device in the ad hoc mesh network identified by the first wake-up identifier, upon receiving the first wake-up broadcast, will activate the two-way communications component of each data communication device in the ad hoc mesh network identified by the first wake-up identifier, and thereafter each data communication device that has activated the corresponding two way communication component will engage in mesh networking communications;

wherein the data communication device is configured to propagate the received first wake-up broadcast, but is configured such that, after receiving and propagating the received first wake-up broadcast, the data communication device will not propagate the received first wake-up broadcast again even if the received first wake-up broadcast is received again; and wherein the first wake-up identifier represents a common designation corresponding to one or more of the tracked one or more metrics related to communications with other network nodes.

* * * * *